US009374205B1

(12) United States Patent
Mansour et al.

(10) Patent No.: US 9,374,205 B1
(45) Date of Patent: Jun. 21, 2016

(54) INTER-CELL INTERFERENCE REDUCTION

(71) Applicant: Sprint Spectrum LP, Overland Park, KS (US)

(72) Inventors: Nagi Mansour, Arlington, VA (US); Emerino J. Marchetti, Clifton, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 162 days.

(21) Appl. No.: 13/975,192

(22) Filed: Aug. 23, 2013

(51) Int. Cl.
- *H04L 5/00* (2006.01)
- *H04L 5/02* (2006.01)
- *H04W 72/08* (2009.01)
- *H04W 72/12* (2009.01)

(52) U.S. Cl.
CPC .............. *H04L 5/0032* (2013.01); *H04L 5/005* (2013.01); *H04L 5/0037* (2013.01); *H04L 5/0044* (2013.01); *H04L 5/023* (2013.01); *H04W 72/1257* (2013.01); *H04W 72/082* (2013.01)

(58) Field of Classification Search
None
See application file for complete search history.

(56) References Cited

U.S. PATENT DOCUMENTS

| 8,204,442 | B2 | 6/2012 | Sankar et al. | |
|---|---|---|---|---|
| 2004/0190482 | A1* | 9/2004 | Baum et al. | 370/347 |
| 2010/0103904 | A1* | 4/2010 | Jou | H04J 13/0003 370/331 |
| 2010/0177687 | A1* | 7/2010 | Sung et al. | 370/328 |
| 2011/0269493 | A1 | 11/2011 | Zhu et al. | |
| 2012/0020326 | A1* | 1/2012 | Zhang | H04B 1/69 370/331 |

* cited by examiner

*Primary Examiner* — Michael Thier
*Assistant Examiner* — Yaotang Wang

(57) ABSTRACT

A wireless communication system serves a first wireless device with a first access node using a frequency band and serves a second wireless device in an adjacent cell with a second access node that uses the same frequency band. The communication of a first resource block is scheduled between the first wireless device and the first access node. The communication of a second resource block between the second wireless device and the second access node is also scheduled. The scheduling of the first resource block and the second resource block correspond in time and frequency. The first resource block is encoded with a first orthogonal code from a family of orthogonal codes. The second resource block is encoded with a second orthogonal code from the family of orthogonal codes. After encoding, the first resource block and the second resource blocks are transmitted using the frequency band.

14 Claims, 6 Drawing Sheets

INTER-CELL INTERFERENCE REDUCTION

TECHNICAL BACKGROUND

Wireless communication may be used as a means of accessing a network. Wireless communication has certain advantages over wired communications for accessing a network. One of those advantages is a lower cost of infrastructure to provide access to many separate locations or addresses compared to wired communications. This is the so-called "last mile" problem. Another advantage is mobility. Wireless communication devices, such as cell phones, are not tied by wires to a fixed location. To use wireless communication to access a network, a customer needs to have at least one transceiver in active communication with another transceiver that is connected to the network.

To facilitate wireless communications, the Institute of Electrical and Electronics Engineers (IEEE) has promulgated a number of wireless standards. These include the 802.11 (WiFi) standards and the 802.16 (WiMAX) standards. Likewise, the International Telecommunication Union (ITU) has promulgated standards to facilitate wireless communications. This includes TIA-856, which is also known as Evolution-Data Optimized (EV-DO). The European Telecommunications Standards Institute (ETSI) has also promulgated a standard known as long term evolution (LTE). Additional standards such as the fourth generation communication system (4 G) are also being pursued. These standards pursue the aim of providing a comprehensive IP solution where voice, data, and streamed multimedia can be given to users on an "anytime, anywhere" basis. These standards also aim to provide higher data rates than previous generations. All of these standards may include specifications for various aspects of wireless communication with a network. These aspects include processes for registering on the network, carrier modulation, frequency bands of operation, and message formats.

A limiting aspect for system performance in wireless networks is inter-cell interference. This is particularly a problem for wireless devices that are near the edge of a cell and in an area that another cell's transmission can reach. Reducing inter-cell interference is particularly important in communication networks that have a frequency reuse factor of one.

Overview

In an embodiment, a method of operating a communication system includes serving a first wireless device with a first access node using a frequency band and serving a second wireless device in an adjacent cell with a second access node using the same frequency band. The communication of a first resource block is scheduled between the first wireless device and the first access node. The communication of a second resource block between the second wireless device and the second access node is also scheduled. The scheduling of the first resource block and the second resource block correspond in time and frequency. The first resource block is encoded with a first orthogonal code from a family of orthogonal codes. The second resource block is encoded with a second orthogonal code from the family of orthogonal codes. After encoding, the first resource block and the second resource blocks are transmitted using the frequency band.

In an embodiment, a method of operating a wireless device includes establishing a communication session with a first access node using a frequency band. The communication session is associated with a first orthogonal code from a family of orthogonal codes. A first schedule to communicate a first resource block between a first wireless device and the first access node is received. An encoded first resource block from the first access node is received using the frequency band. The encoded first resource block is decoded with the first orthogonal code.

In an embodiment, a wireless communication system includes a first access node configured to serve a first wireless device using a frequency band and a second access node configured to serve a second wireless device using the frequency band. The first access node and the second access node have overlapping coverage areas. The communication system includes a resource scheduler configured to schedule a first communication of a first resource block between the first wireless device and the first access node and a second communication of a second resource block between the second wireless device and the second access node. The resource scheduler schedules the first resource block and the second resource block to be transmitted overlapping in time and frequency. The communication system includes a first encoder configured to encode a first resource block into a first encoded resource block by applying a first orthogonal code from a family of orthogonal codes to the first resource block. The communication system includes a second encoder configured to encode a second resource block into a second encoded resource block by applying a second orthogonal code from the family of orthogonal codes to the second resource block. The first access node includes a first transmitter to send the first encoded resource block using the frequency band. The second access node includes a second transmitter to send the second encoded resource block using the frequency band.

DETAILED DESCRIPTION

In an embodiment, long-term evolution (LTE) allocations of time and frequency (resource blocks) are further encoded using a set of orthogonal codes. The resource blocks for each sector in a cell, and each sector in an adjacent cell, are multiplied by different orthogonal codes. Since the codes are orthogonal, interference between sectors that are using different orthogonal codes is reduced. The interference between sectors is reduced without restricting what resources in time and/or frequency (i.e., resource blocks) are available to be scheduled in each sector, or what transmit power may be used in certain time-frequency resources. Accordingly, all resource blocks in all sectors are available to be scheduled and the capacity and/or performance of the wireless communication system is increased.

Figure 1:
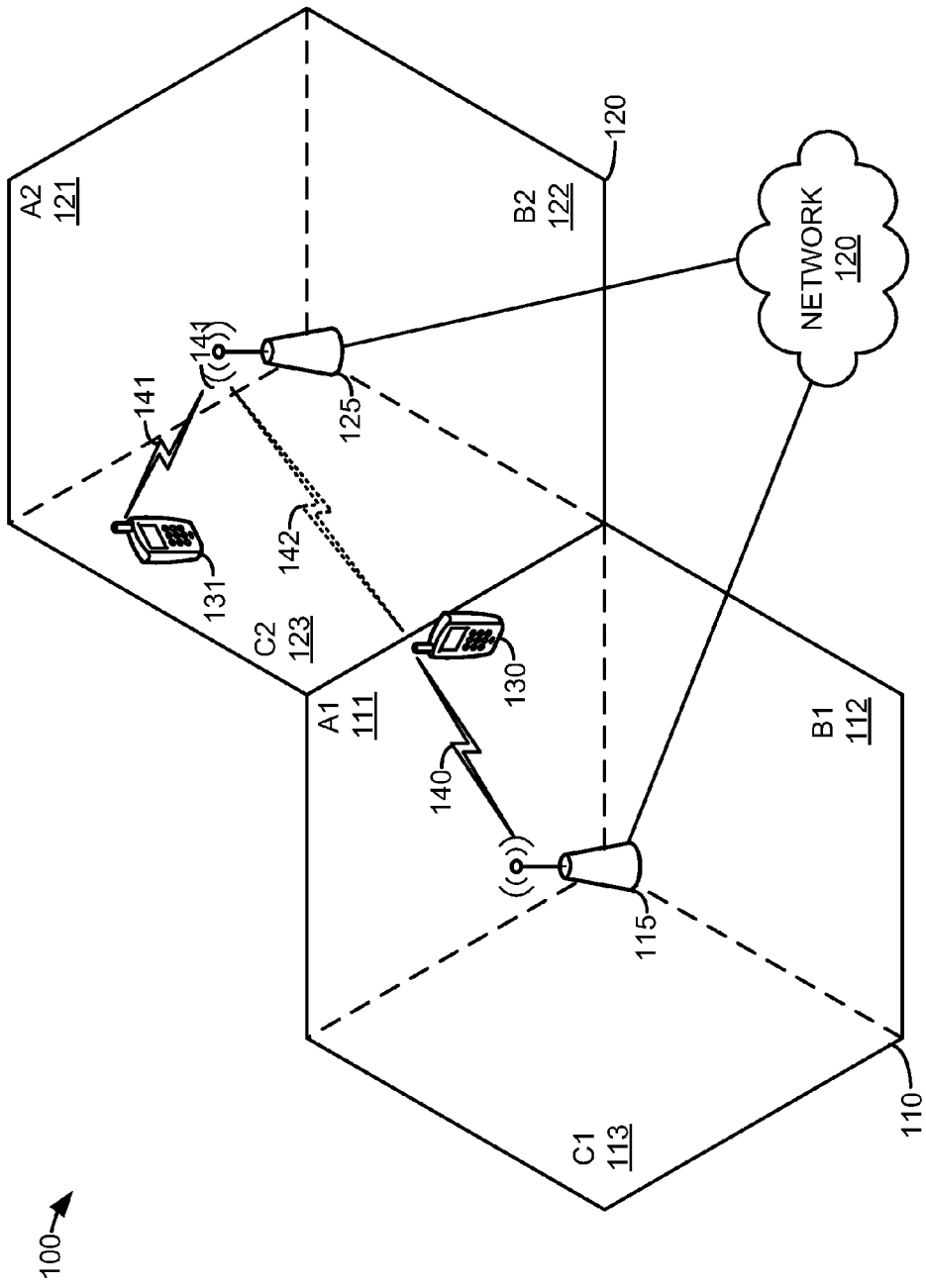
FIG. 1 is a block diagram illustrating a communication system.

FIG. 1 is a block diagram illustrating a communication system. In FIG. 1, communication system 100 comprises service area 110, service area 120, access node 115, access node 125, wireless device 130, and wireless device 131. Access nodes 115 and 125 may also be referred to as base stations or wireless stations. Access node 115 is operatively coupled to network 120. Access node 125 is operatively coupled to network 120. Wireless device 130 is operatively coupled to access node 115 via wireless link 140. Wireless device 130 may receive/send transmissions from access node 125 via wireless link 142. Wireless device 131 is operatively coupled to access node 125 via wireless link 141. Wireless link 140, wireless link 141, and wireless link 142 use the same frequency band. Thus, transmissions to and/or from access node 125 (i.e., wireless link 141 and/or wireless link 142) may interfere with transmissions to and/or from access node 115 to wireless device 130. Likewise, transmissions from wireless device 130 may interfere with transmissions to and/or from wireless device 131 being served by access node 125.

Service area 110 comprises three sectors A1 111, B1 112, and C1 113. Service area 120 comprises three sectors A2 121, B2 122, and C2 123. Wireless device 130 is served by (i.e., communicates data with) access node 115 via wireless link 140. Wireless device 130 is shown in sector A1 111 of service area 110. Wireless device 131 is served by (i.e., communicates data with) access node 125 via wireless link 141. Wireless device 131 is shown in sector C2 123 of service area 120.

In FIG. 1, service area 110 and service area 120 are shown as hexagons. Each sector 111-113 and 121-123 of service area 110 and service area 120, respectively, occupies one-third of a hexagon. The sectors in FIG. 1 are shown with the "A" sectors 111 and 121 in the upper right one-third of the service area 110 and 120, respectively. The "B" sectors 112 and 122 are shown in the lower right one-third of service area 110 and 120, respectively. The "C" sectors 113 and 123 are shown in the left one-third of service area 110 and 120, respectively. Also in FIG. 1, sector A1 111 and C2 123 are adjacent and share a common boundary. It should be understood that service area 110 and service area 120 (and sector A1 111 and sector C2 123, in particular) may overlap. Thus, transmissions to/from wireless devices (e.g., wireless device 130) in service area 110 and service area 120 may interfere with each other. Likewise, transmissions to/from wireless devices (e.g., wireless device 130) in sectors 111-113 of service area 110 may interfere with each other.

Network 120 is a communication network that can provide communication between access node 115, access node 125, and other wired or wireless networks. Communication system 100 can comprise wired and/or wireless communication networks that include processing nodes, routers, gateways, physical and/or wireless data links for carrying data among various network elements, including combinations thereof, and can include a local area network, a wide area network, and an internetwork (including the Internet). Communication system 100 can also comprise wireless networks, including base station, wireless communication nodes, telephony switches, internet routers, network gateways, computer systems, communication links, or some other type of communication equipment, and combinations thereof.

Wired network protocols that may be utilized by communication system 100 and/or network 120 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Wireless network protocols that may be utilized by communication system 100 and/or network 150 may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX).

Other network elements may be present in communication system 100 (and present in wireless network 120, in particular) to facilitate wireless communication to/from wireless device 130 and wireless device 131 but are omitted for clarity, such as base stations, base station controllers, gateways, mobile switching centers, dispatch application processors, and location registers such as a home location register or visitor location register. Furthermore, other network elements may be present to facilitate communication between access node 115, access node 125 and network 120 which are omitted for clarity, including additional processing nodes, routers, gateways, and physical and/or wireless data links for carrying data among the various network elements.

In LTE specified technology, for a 5 MHz system, there are 25 resource blocks (RBs) in each 1 ms subframe. Each subframe has 168 resource elements (REs). A resource element is the minimum allocation in the frequency and in the time domain.

Resource elements are allocations of frequency and time that access node 115 and access node 125 utilize to communicate with wireless devices. For example, in an LTE specified system, transmissions are divided into subframes. Subframes are allocations of transmission times. Each subframe is further divided into allocations of frequency and symbols. Symbols are an allocation of time that is less than a subframe. A minimum unit of frequency and time that may be allocated in a subframe (or resource block) of an LTE specified system may be referred to as a slot (84 REs in a 5 MHz system). Two 0.5 ms slots (i.e., resource blocks) comprise a 1 ms subframe. The term "slot" may be applied to other wireless systems. In particular the term "slot" (meaning an allocation of frequency and time) may be used to describe the sub-channels of other systems that utilize orthogonal frequency-division multiple access (OFDMA).

Wireless device 130 may be any device, system, combination of devices, or other such communication platform capable of communicating with access node 115 via wireless link 140 and being interfered with by transmissions on wireless link 142 and/or transmissions on wireless link 141. Wireless device 130 and wireless device 131 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can exchange data with access node 115 via wireless link 140 and access node 115 via wireless link 141, respectively. Other types of communication platforms are possible.

Access node 115 and access node 125 may be any wireless system that provides communication connectivity to network 150. Examples of access nodes, base stations, and wireless stations that may be utilized include, base transceiver stations (BTSs), radio base stations (RBSs), Node B, enhanced Node B (eNBs) and others. Access nodes, base stations, and wireless stations may include a number of elements known to those skilled in the art comprising a transceiver, power amplifier, combiner, duplexer, antenna and control function.

In an embodiment, communication system 100 is configured with a frequency reuse factor of one. In other words, all sectors 111-113 and 121-123 transmit/receive using the same frequency band. Transmissions to and/or from wireless devices serviced by sectors 111-113 and 121-123 are each multiplied by an orthogonal code (from a family of orthogonal codes) before transmission. The orthogonal code for each sector 111-113 and 121-123 can all be different members from the family of orthogonal codes.

For example, the resource blocks being transmitted to and/or from sector A1 111 may be multiplied by a first Walsh code (e.g., a first Walsh code from the family of Walsh codes of length N—$W_1^N$), resource blocks being transmitted to and/or from sector C2 123 may be multiplied by second Walsh code in the same family (e.g., $W_2^N$); resource blocks being transmitted to and/or from sector B1 112 may be multiplied by third Walsh code in the same family (e.g., $W_3^N$), etc.

Multiplication by these different orthogonal codes reduces or eliminates correlations between the resource blocks (and resource elements) being transmitted to and/or from different sectors. Reducing or eliminating correlations between the resource blocks (and resource elements) being transmitted to and/or from different sectors at the same time and in the same frequency band helps reduce and/or eliminate interference between different sectors.

Service area 110 illustrates the area serviced by access node 115. Sectors A1 111, B1 112, and C1 113 correspond to areas serviced by access node 115. In an embodiment, the resource blocks transmitted to and/or from each of sectors A1 111, B1 112, and C1 113 are multiplied by a different orthogonal code from a family of orthogonal codes. Service area 120 illustrates the area serviced by access node 125. Sectors A2 121, B2 122, and C2 123 correspond to areas serviced by access node 125. In an embodiment, the resource blocks transmitted to and/or from each of sectors A2 121, B2 122, and C2 123 are multiplied by a different orthogonal code from a family of orthogonal codes. The selection of orthogonal codes for each of sectors A1 111, B1 112, C1 113, A2 121, B2 122, and C2 123 can be selected and arranged such that the resource blocks of adjacent access nodes (e.g., access node 115 and access node 125) are all multiplied by different orthogonal codes. The selection of orthogonal codes for each of sectors A1 111, B1 112, C1 113, A2 121, B2 122, and C2 123 can be selected and arranged such that the resource blocks of facing sectors from different access nodes (e.g., sector A1 111 and sector C2 123) are multiplied by different orthogonal codes.

In FIG. 1, wireless device 130 is being served by access node 115 using a frequency band common to access node 115 and access node 125. Wireless device 131 is being served by second access node 125 using the common frequency band. As illustrated in FIG. 1, access node 115 is adjacent to access node 125. Communication system 100 can schedule a communication of a first resource block between wireless device 130 and access node 115. Communication system 100 can schedule a communication of a second resource block between wireless device 131 and access node 125. Communication system 100 can schedule the first resource block and the second resource block to be transmitted at a corresponding (i.e., the same or overlapping) time and frequency. In other words, the first resource block and the second resource block are scheduled to be transmitted concurrently and on the same frequency subcarrier.

Access node 115 (or wireless device 130) encodes the first resource block with a first orthogonal code from a family of orthogonal codes to create an encoded first resource block. Access node 125 (or wireless device 131) encodes the second resource block with a second orthogonal code from the family of orthogonal codes to create an encoded second resource block. Access node 115 (or wireless device 130) transmits the encoded first resource block using the frequency band at the scheduled time and subcarrier frequency. Access node 125 (or wireless device 131) transmits the encoded second resource block at the scheduled time and subcarrier frequency. Accordingly, since the encoded first resource block and the encoded second resource block are corresponding in time and frequency when they are transmitted, they can interfere with each other. However, since the encoded first resource block and the encoded second resource block were encoded with different orthogonal codes from a family of orthogonal codes, the interference is reduced.

In an embodiment, the encoded first resource block is transmitted as part of a first frame of resource blocks. Likewise, the encoded second resource block is transmitted as part of a second frame of resource blocks. The entire first frame of resource blocks can be encoded with the first orthogonal code. Likewise, the entire second frame of resource blocks can be encoded with the second orthogonal code.

It should be understood that additional wireless devices (not shown in FIG. 1) may be served by access node 115 and/or access node 125. The additional wireless devices may be served by a different sector than wireless device 130 or wireless device 131. Communication system 100 can schedule a communication of a third resource block between one or more of these additional wireless devices and access node 115. Communication system 100 can schedule the transmission of the third resource block to corresponding in time and frequency to the transmission of the first resource block and the second resource block. The third resource block can be encoded with a third orthogonal code to create an encoded third resource block. The encoded third resource block can be transmitted at the scheduled time and subcarrier frequency.

Wireless device 130 may establish a communication session with access node 115 using a frequency band. This communication session may be associated by access node 115 and wireless device 130 with an orthogonal code from a family of orthogonal codes. Access node 115 may transmit an indicator of the identity of the orthogonal code to wireless device 130 in order to associate the communication session with the orthogonal code. Wireless device 130 may receive, from access node 115, a first schedule to communicate a resource block between wireless device 130 and access node 115. Wireless device 130 may receive an encoded resource block from access node 115. The resource block is communicated between wireless device 130 and access node 115 according to the received schedule. Wireless device 130 decodes the encoded resource block using the orthogonal code. Decoding the encoded resource block results in a first resource block. Decoding the encoded resource block can result in a first resource block that has been communicated with less interference from other adjacent access nodes (e.g., access node 124) and/or sectors (e.g., sector C2 123).

Transmissions of other resource block from adjacent access nodes (e.g., access node 124) and/or sectors (e.g., sector C2 123) can comprise encoded resource blocks that have been encoded with a different orthogonal code. These resource blocks are also received by wireless device 130 as interference (because the transmissions from adjacent access nodes and/or sectors interfere with communications between wireless device 130 and access node 115). However, since the resource blocks from adjacent access nodes (e.g., access node 124) and/or sectors (e.g., sector C2 123) are encoded with a different orthogonal code from the family of orthogonal codes, this amount of interference, after decoding, is reduced.

Figure 2:
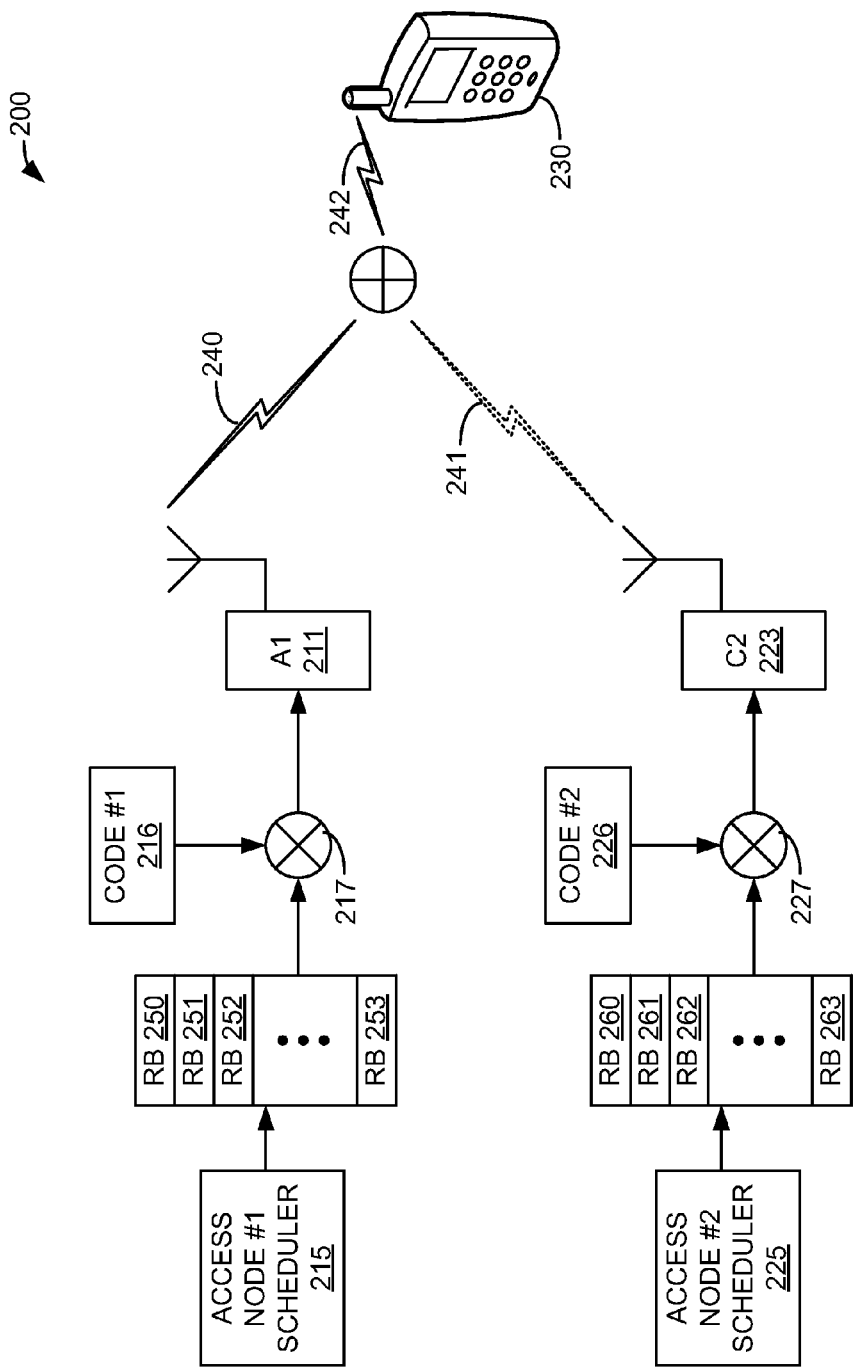
FIG. 2 is a block diagram illustrating a wireless communication system.

FIG. 2 is a block diagram illustrating a wireless communication system. In FIG. 2, communication system 200 comprises access node #1 scheduler 215, resource blocks 250-253, code #1 216, encoder 217, sector A1 211, access node #2 scheduler 225, resource blocks 260-263, code #2 226, encoder 227, sector C2 223, and wireless device 230. Access node #1 scheduler 215 is operatively coupled to resource blocks 250-253. Resource blocks 250-253 and code #1 are operatively coupled to encoder 217. The output of encoder 217 is operatively coupled to sector A1 211. Access node #2 scheduler 225 is operatively coupled to resource blocks 260-

263. Resource blocks 260-263 and code #2 are operatively coupled to encoder 227. The output of encoder 227 is operatively coupled to sector C2 223.

Transmissions 240 from sector A1 211 are combined over-the-air with interfering transmissions 241 from sector C2 223 to form signal 242. Signal 242 is received by wireless device 230. Sector A1 211 and sector C2 223 may be adjacent and/or have overlapping coverage areas.

Access node #1 scheduler schedules the communication of resource blocks 250-253. Resource blocks 250-253 may comprise a frame or subframe of resource blocks. Resource blocks 250-253 are encoded with code #1 216 by encoder 217. In other words, encoder 217 applies code #1 to resource blocks 250-253. Encoded resource blocks output by encoder 217 are transmitted by sector A1 211 to wireless device 230 via transmissions 240 and signal 242. Sector A1 211 includes a transmitter that sends the encoded resource blocks output by encoder 217 to wireless device 130 using a frequency band.

Access node #2 scheduler schedules the communication of resource blocks 260-263. Resource blocks 260-263 may comprise a frame or subframe of resource blocks. Resource blocks 260-263 are encoded with code #2 226 by encoder 227. Encoded resource blocks output by encoder 227 are transmitted by sector C2 223. Interfering transmissions 241 from sector 223 are received by wireless device 230 via signal 242. Sector C2 223 includes a transmitter that sends the encoded resource blocks output by encoder 227 using the same frequency band that is used by sector A1 211.

In an embodiment, access node #1 scheduler 215, resource blocks 250-253, code #1 216, encoder 217, and sector A1 211 are included in access node 115 shown in FIG. 1. Access node #2 scheduler 225, resource blocks 260-263, code #2 226, encoder 227, and sector C2 223 are included in access node 125. Code #1 216 is a first orthogonal code from a family of orthogonal codes. Code #2 226 is a second orthogonal code from the family of orthogonal codes. Access node #1 scheduler 215 and access node #2 scheduler 225 schedule resource blocks 250-253 and 260-263, respectively, such that at least one of resource blocks 250-253 and resource blocks 260-263 will overlap each other in time and frequency when transmitted. Accordingly, if wireless device 130 is communicating with sector A1 211, the transmission of the overlapping block by sector C2 223 will be seen as interference by wireless device 230. However, since code #1 216 and code #2 226 are orthogonal to each other (because they are both from the same family of orthogonal codes), the interference seen by wireless device (after decoding received encoded resource blocks with code #1 216) will be reduced.

It should be understood that sector A1 211 and sector C2 223 may include receivers and decoders. The receivers in sector A1 211 and sector C2 223 may receive encoded resource blocks from wireless device 230. The decoder in sector A1 211 may decode encoded resource blocks from wireless device 230 using code #1 216. The decoder in sector C2 223 may decode encoded resource blocks from wireless device 230 using code #2 226. The results of these decoding are either unencoded resource blocks, or noise, respectively.

Figure 3:
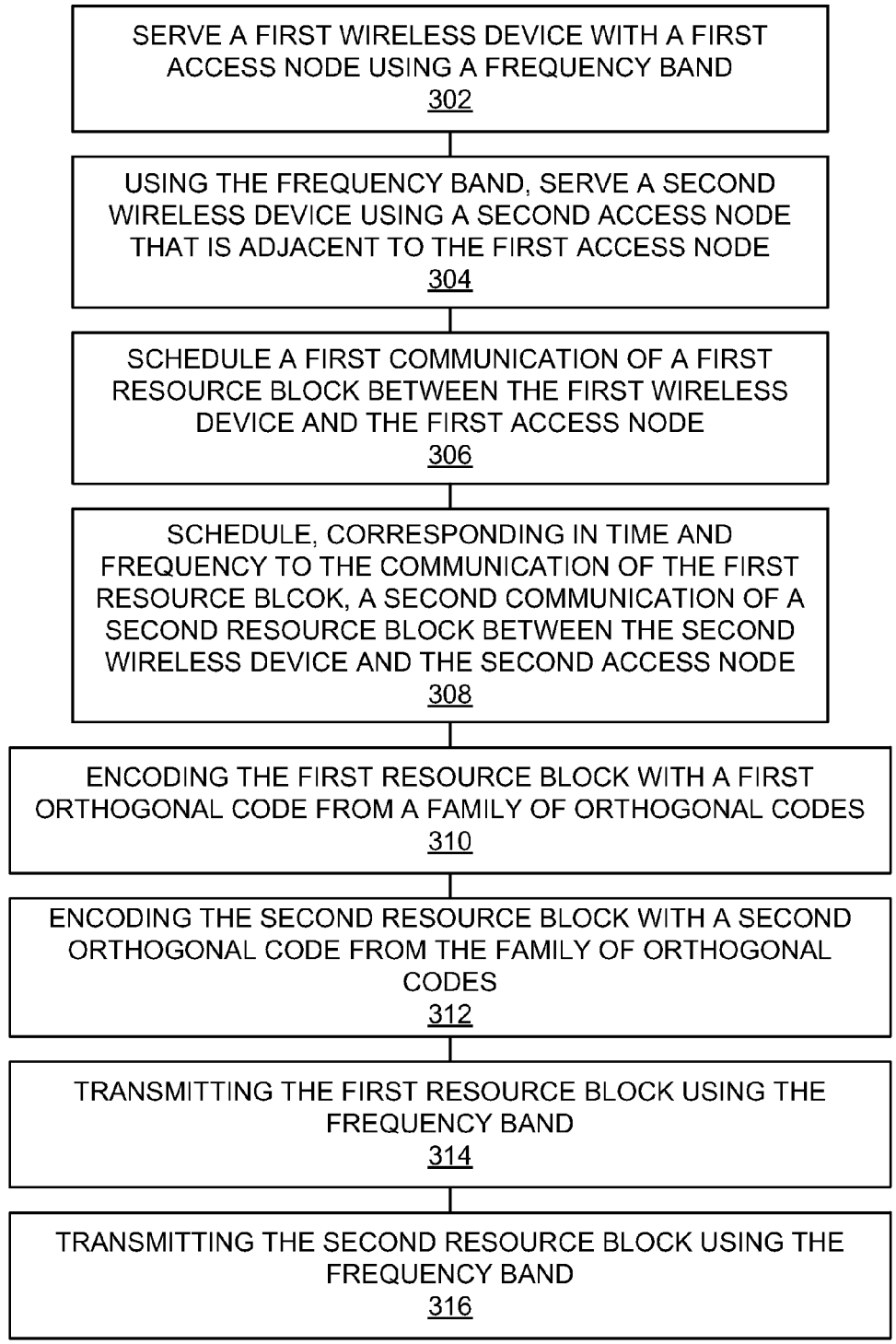
FIG. 3 is a flowchart illustrating a method of operating a communication system.

FIG. 3 is a flowchart illustrating a method of operating a communication system. The steps illustrated in FIG. 3 may be performed by one or more elements of communication system 100 and/or communication system 200. A first wireless device is served by a first access node using a frequency band (302). For example, wireless device 130 may be served by access node 115 using a particular frequency band. In another example, wireless device 230 may be served by sector A1 211.

Using the frequency band, a second wireless device is served by a second access node that is adjacent to the first access node (304). For example, wireless device 131 may be served by access node 125 using the same frequency band that access node 125 uses to serve wireless device 130. In another example, sector C2 223 may serve a wireless device using the same frequency band as sector A1 211 is using to serve wireless device 230.

A first communication between the first wireless device and the first access node is scheduled (306). For example, a communication of a resource block between wireless device 130 and access node 115 can be scheduled by communication system 100. This communication may be an uplink or downlink communication. In another example, a resource block 250-253 may be scheduled by access node #1 scheduler 215. The scheduled resource block 250-253 may be scheduled for communication via the uplink or downlink with wireless device 230.

A second communication between the second wireless device and the second access node, which corresponds in time and frequency to the communication of the first resource block, is scheduled (308). For example, a communication of a resource block between wireless device 131 and access node 125 can be scheduled by communication system 100. This communication may be an uplink or downlink communication. This second communication can correspond in time and frequency to a communication between access node 115 and wireless device 130. In another example, a resource block 260-263 may be scheduled by access node #2 scheduler 225. The scheduled resource block 260-263 may be scheduled for communication via the uplink or downlink. The communication of at least one of resource blocks 260-263 may overlap in time and frequency, the communication of at least one of resource blocks 250-253.

The first resource block is encoded with a first orthogonal code from a family of orthogonal codes (310). For example, access node 115 may encode a resource block with a first orthogonal code from a family or orthogonal codes. In another example, encoder 217 may encode one or more of resource blocks 250-253 with code #1 216.

The second resource block is encoded with a second orthogonal code from the family of orthogonal codes (312). For example, access node 125 may encode a resource block with a second orthogonal code from the family or orthogonal codes. In another example, encoder 227 may encode one or more of resource blocks 260-253 with code #2 226.

The first resource block is transmitted using the frequency band (314). For example, access node 115 (or wireless device 130) may transmit the encoded resource block. In another example, sector A1 211 may transmit an encoded resource block received from encoder 217.

The second resource block is transmitted using the frequency band (316). For example, access node 125 (or wireless device 131) may transmit an encoded resource block. In another example, sector C2 223 may transmit an encoded resource block received from encoder 227. Sector C2 223 may transmit the encoded resource block received from encoder 227 at the same time, and using the same subcarrier (a.k.a., sub-band) as sector A1 211 transmits or receives a resource block 250-253.

Figure 4:
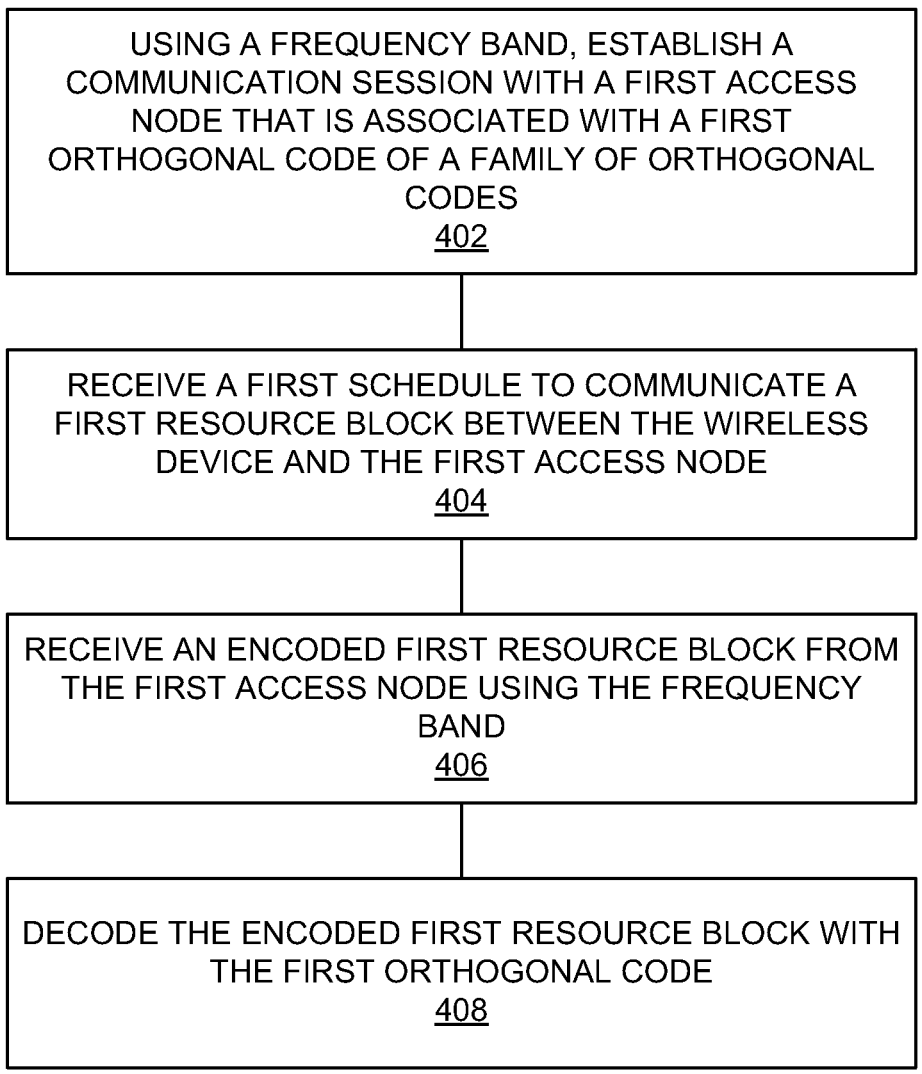
FIG. 4 is a flowchart illustrating a method of operating a wireless device.

FIG. 4 is a flowchart illustrating a method of operating a wireless device. The steps illustrated in FIG. 4 may be performed by one or more elements of communication system 100 and/or communication system 200. Using a frequency band, a communication session is established with a first access node that is associated with a first orthogonal code from a family of orthogonal codes (402). For example, wireless device 230 may establish a communication session with sector A1 211. This communication session may be associated with code #1 216. Code #1 216 may be from a family of orthogonal codes. Other members of this family of orthogonal codes may be associated with other communication sessions. For example, another member of this family of orthogonal codes may be associated with one or more communication sessions with sector C2 223.

A first schedule to communicate a first resource block between the wireless device and the first access node is received (404). For example, wireless device 230 may receive, from access node #1 scheduler 215, a schedule that indicates a resource block should be communicated between wireless device 230 and sector A1 211 at a certain time and using a certain subchannel of the frequency band.

Using the frequency band, an encoded first resource block is received from the first access node (406). For example, wireless device 230 may receive an encoded version of resource block 250 from sector A1 211. The encoded first resource block is decoded using the first orthogonal code (408). For example, wireless device 230 may decode the received encoded version of resource block 250 using code #1 216. Wireless device may also decode signal 242 using code #1 216. Since signal 242 is a combination of a resource block encoded with code #1 216 and an interfering encoded resource block (e.g., resource block 260), decoding signal 242 with code #1 216 should reduce the amount of interference presented by transmission 241.

Figure 5:
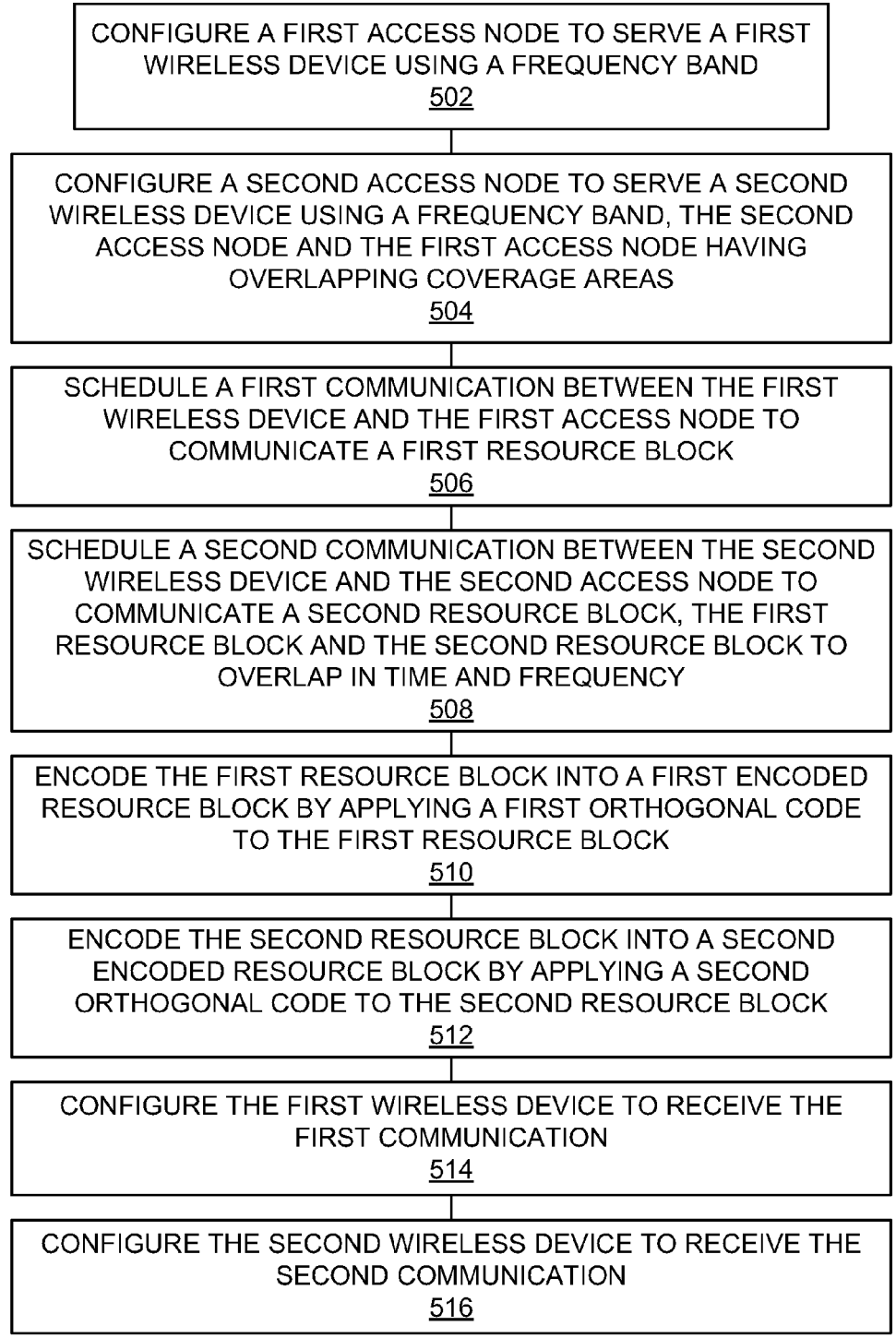
FIG. 5 is flowchart illustrating a method of operating a wireless communication system.

FIG. 5 is flowchart illustrating a method of operating a wireless communication system. The steps illustrated in FIG. 5 may be performed by one or more elements of communication system 100 and/or communication system 200. A first access node is configured to serve a first wireless device using a frequency band (502). For example, access node 115 may be configured to serve wireless device 130. A second access node is configured to serve a second wireless device using the frequency band. The second access node and the first access node having overlapping coverage areas (504). For example, access node 125 may be configured to serve wireless device 131. Coverage area 120 associated with access node 125 and coverage area 110 associated with access node 115 may overlap at least to the extent that transmissions from access node 125 can interfere with communications between access node 115 and wireless device 130.

A first communication between the first wireless device and the first access node is scheduled to communicate a first resource block (506). For example, a transmission may be scheduled to communicate a resource block between access node 115 and wireless device 130. A second communication between the second wireless device and the second access node is scheduled to communicate a second resource block such that the first resource block and the second resource block overlap in time and frequency (508). For example, a transmission may be scheduled to communicate a resource block between access node 125 and wireless device 131. This transmission may be scheduled such that the transmission of the first resource block by access node 115 overlaps in time and frequency the transmission of the second resource block by access node 125.

The first resource block is encoded into a first encoded resource block by applying a first orthogonal code to the first resource block (510). For example, access node 115 may create an encoded first resource block by applying a first orthogonal code from a family or orthogonal codes to the first resource block. In another example, encoder 217 may create an encoded resource block by applying code #1 216 to resource block 250.

The second resource block is encoded into a second encoded resource block by applying a second orthogonal code to the second resource block (510). For example, access node 125 may create an encoded second resource block by applying a second orthogonal code from the family or orthogonal codes to the second resource block. In another example, encoder 227 may create an encoded resource block by applying code #2 226 to resource block 260.

The first wireless device is configured to receive the first communication (514). For example, wireless device 130 may be configured by communication system 100 to receive the first encoded resource block and decode with the appropriate orthogonal code. In another example, wireless device 230 may be configured to receive an encoded version of resource block 250 and to decode the received resource block using code #1 216.

The second wireless device is configured to receive the second communication (514). For example, wireless device 131 may be configured by communication system 100 to receive the second encoded resource block and decode with the appropriate orthogonal code (which is not the same code wireless device 130 uses to decode the first resource block).

The methods, systems, devices, networks, access nodes, and equipment described above may be implemented with, contain, or be executed by one or more computer systems and/or processing nodes. The methods described above may also be stored on a non-transitory computer readable medium. Many of the elements of communication system 100 and/or communication system 200 may be, comprise, or include computers systems and/or processing nodes. This includes, but is not limited to: wireless device 130, wireless device 131, access node 115, access node 125, access node scheduler 215, resource blocks 250-253, encoder 217, sector 211, access node scheduler 225, resource blocks 260-263, encoder 227, sector 223, and/or network 150.

Figure 6:
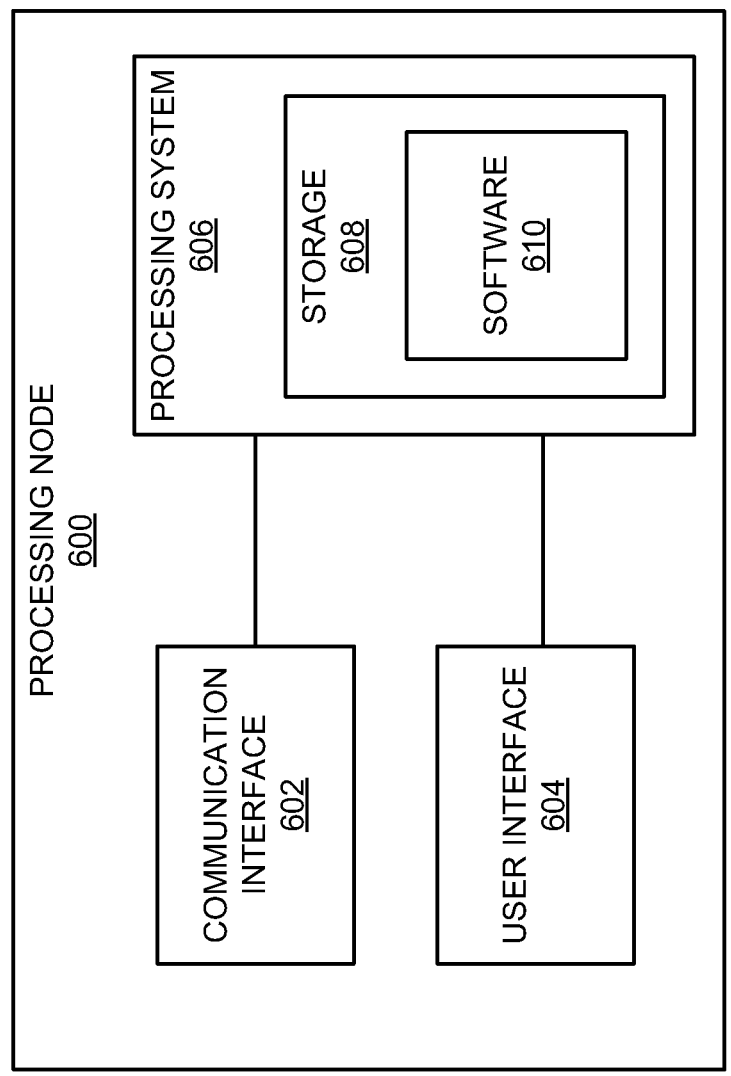
FIG. 6 illustrates a processing node.

FIG. 6 illustrates an exemplary processing node 600 comprising communication interface 602, user interface 604, and processing system 606 in communication with communication interface 602 and user interface 604. Processing node 600 is capable of paging a wireless device. Processing system 606 includes storage 608, which can comprise a disk drive, flash drive, memory circuitry, or other memory device. Storage 608 can store software 610 which is used in the operation of the processing node 600. Storage 608 may include a disk drive, flash drive, data storage circuitry, or some other memory apparatus. Software 610 may include computer programs, firmware, or some other form of machine-readable instructions, including an operating system, utilities, drivers, network interfaces, applications, or some other type of software. Processing system 606 may include a microprocessor and other circuitry to retrieve and execute software 610 from storage 608. Processing node 600 may further include other components such as a power management unit, a control interface unit, etc., which are omitted for clarity. Communication interface 602 permits processing node 600 to communicate with other network elements. User interface 604 permits the configuration and control of the operation of processing node 600.

An example of processing node 600 includes access node 115. Processing node 600 can also be an adjunct or component of a network element, such as an element of wireless device 130, wireless device 131, access node 115, access node 125, and network 120, a mobility management entity, a gateway, a proxy node, an application server, or another network element in a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a communication system, comprising:
    serving a first wireless device located in a first sector of a first access node using a frequency band common to the first access node and a second wireless device located in a second sector of a second access node, the second sector of the second access node being adjacent to the first sector of the first access node;
    serving a third wireless device located in a third sector of the first access node using the common frequency band, the third sector being a non-facing sector relative to the second sector of the second access node;
    scheduling a first interfering resource block transmitted to the first wireless device in the first sector from the first access node, and a second interfering resource block transmitted to the second wireless device in the second sector from the second access node, at a concurrent time and frequency, wherein the first and second interfering resource blocks are encoded with respective first and second orthogonal codes from a family of orthogonal codes, the first orthogonal code being different from the second orthogonal code;
    scheduling the first interfering resource block and a third interfering resource block transmitted to the third wireless device in the third sector from the first access node, at a concurrent time and frequency, wherein the first and third interfering resource blocks are encoded with the respective first orthogonal code and a third orthogonal code from the same family of orthogonal codes, the first orthogonal code being different from the third orthogonal code; and,
    applying the first orthogonal code to the transmitted first and second interfering resource blocks at the first wireless device to decode the first interfering resource block.

2. The method of claim 1, wherein the first interfering resource block is transmitted as part of a first frame of resource blocks and the second interfering resource block is transmitted as part of a second frame of resource blocks and the first frame of resource blocks are encoded with the first orthogonal code and the second frame of resource blocks are encoded with the second orthogonal code.

3. A method of operating a first wireless device, comprising:
    establishing a communication session at a first sector with a first access node using a frequency band common to the first sector of the first access node and a second interfering sector of the first access node;
    receiving, from the first access node, a first schedule to communicate a first encoded resource block from the first wireless device located in the first sector to the first access node, the first resource block being encoded with a first orthogonal code, wherein the first schedule is at a same time and frequency as a second schedule assigned to a second wireless device located in the second interfering sector served by the first access node;
    combining, during over-the-air transmission, the encoded first resource block based on the first schedule and a second encoded resource block sent from the second wireless device based on the second schedule, the encoded second resource block being encoded with a second orthogonal code from a same family of orthogonal codes as the first orthogonal code;
    receiving, from the first access node, a third schedule to communicate the first encoded resource block from the first wireless device located in the first sector to the first access node, wherein the third schedule is at a same time and frequency as a fourth schedule assigned to a third wireless device located in a third adjacent sector of a second access node and the third wireless device is served by the second access node using the common frequency band;
    combining, during over-the-air transmission, the encoded first resource block based on the third schedule and a third encoded resource block sent from the third wireless device based on the fourth schedule, the encoded third resource block being encoded with a third orthogonal code from the same family of orthogonal codes as the first orthogonal code; and
    receiving, at the first access node, the combined encoded resource blocks and decoding the encoded first resource block with the first orthogonal code, wherein the first orthogonal code is different from the second orthogonal code and the first orthogonal code is different from the third orthogonal code.

4. The method of claim 3, wherein decoding the encoded first resource block with the first orthogonal code results in a first resource block.

5. The method of claim 4, wherein the encoded first resource block is received concurrently with the encoded second resource block, the encoded second resource block encoded with the second orthogonal code from the family of orthogonal codes.

6. The method of claim 5, wherein the encoded first resource block is received from the first sector of the first access node and the encoded second resource block is received from the second interfering sector of the first access node.

7. The method of claim 3, wherein the encoded first resource block is transmitted concurrently with the third encoded resource block, wherein the third encoded resource block is transmitted by the second access node using the common frequency band.

8. The method of claim 3, wherein the encoded first resource block is transmitted by the first sector of the first access node concurrently with the second resource block encoded with the second orthogonal code from the family of orthogonal codes, the encoded second resource block transmitted to the second interfering wireless device being served by the first access node using the common frequency band.

9. A wireless communication system comprising:
a first access node configured to serve a first wireless device located in a first sector of the first access node and a third wireless device located in a third sector of the first access node using a frequency band common to the first access node and a second wireless device located in a second sector of a second access node, the second sector of the second access node being adjacent to the first sector of the first access node, and the third sector being a non-facing sector relative to the second sector;
a resource scheduler configured to schedule a first interfering resource block transmitted to the first wireless device in the first sector from the first access node, and a second interfering resource block transmitted to the second wireless device in the second sector from the second access node, at an overlapping time and frequency, wherein the first and second interfering resource blocks are encoded with respective first and second orthogonal codes from a same family of orthogonal codes, the first orthogonal code being different from the second orthogonal code; and
the resource scheduler configured to schedule the first interfering resource block and a third interfering resource block transmitted to the third wireless device in the third sector from the first access node, at an overlapping time and frequency, wherein the first and third interfering resource blocks are encoded with the respective first orthogonal code and a third orthogonal code from the family of orthogonal codes, the first orthogonal code being different from the third orthogonal code,
wherein the first orthogonal code is applied to the transmitted first and second interfering resource blocks to decode the first interfering resource block at the wireless device located in the first sector of the first access node.

10. The communication system of claim 9, further comprising:
a first receiver included in the first access node to receive an encoded resource block transmitted from the first wireless device located in the first sector of the first access node using the common frequency band;
a second receiver included in the second access node to receive another encoded resource block transmitted from the second wireless device located in the second sector of the second access node using the common frequency band;
a first decoder configured to decode the encoded resource block by applying the first orthogonal code to the encoded resource block; and,
a second decoder configured to decode the other encoded resource block by applying the second orthogonal code to the other encoded resource block.

11. The wireless communication system of claim 9, wherein the first interfering resource block is transmitted in part of a first subframe of resource blocks and the second interfering resource block is transmitted as part of a second subframe of resource blocks and the first subframe of resource blocks are encoded with the first orthogonal code and the second subframe of resource blocks are encoded with the second orthogonal code.

12. The wireless communication system of claim 9, wherein the first access node transmits an indicator of an identity of the first orthogonal code to the first wireless device located in the first sector of the first access node.

13. The wireless communication system of claim 9, wherein the first wireless device located in the first sector of the first access node includes a first orthogonal code decoder to decode the first interfering resource block into a first decoded resource block by applying the first orthogonal code to the first interfering resource block.

14. The wireless communication system of claim 10, wherein the first wireless device located in the first sector of the first access node includes a first transmitter to send the third encoded resource block from the first wireless device located in the first sector using the common frequency band.

* * * * *